United States Patent
Kishiyama et al.

(10) Patent No.: US 8,422,356 B2
(45) Date of Patent: Apr. 16, 2013

(54) BASE STATION, USER APPARATUS, AND METHOD

(75) Inventors: Yoshihisa Kishiyama, Yokosuka (JP); Kenichi Higuchi, Yokohama (JP); Mamoru Sawahashi, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 66 days.

(21) Appl. No.: 12/447,858

(22) PCT Filed: Oct. 30, 2007

(86) PCT No.: PCT/JP2007/071136
§ 371 (c)(1), (2), (4) Date: Jul. 23, 2009

(87) PCT Pub. No.: WO2008/053894
PCT Pub. Date: May 8, 2008

(65) Prior Publication Data
US 2010/0034076 A1     Feb. 11, 2010

(30) Foreign Application Priority Data
Nov. 1, 2006   (JP) ................. 2006-298311

(51) Int. Cl.
*H04J 11/00*     (2006.01)
(52) U.S. Cl.
USPC ........................................................ 370/210
(58) Field of Classification Search .................. 370/329, 370/335, 210; 455/452.2
See application file for complete search history.

(56) References Cited

U.S. PATENT DOCUMENTS

| | | | |
|---|---|---|---|
| 7,852,813 B2 * | 12/2010 | Suh et al. | 370/335 |
| 7,912,475 B2 * | 3/2011 | Klang et al. | 455/452.2 |
| 2006/0089102 A1 | 4/2006 | Nishio et al. | |
| 2007/0070944 A1 * | 3/2007 | Rinne et al. | 370/329 |

FOREIGN PATENT DOCUMENTS
CN     1732642 A     2/2006

OTHER PUBLICATIONS

International Search Report w/translation from PCT/JP2007/071136 dated Feb. 12, 2008 (2 pages).
NTT DoCoMo, et al.; "Scrambling Code in E-UTRA Downlink"; 3GPP TSG RAN WG1 Meeting #46bis; R1-062712; Seoul, Korea; Oct. 9-13, 2006 (5 pages).
Motorola; "Downlink reference signal sequence design"; 3GPP TSG RAN WG1 Meeting #46; R1-062071; Tallinn, Estonia; Aug. 28-Sep. 1, 2006 (4 pages).
Written Opinion from PCT/JP2007/071136 dated Feb. 12, 2008 (3 pages).

(Continued)

*Primary Examiner* — Mark Rinehart
*Assistant Examiner* — Gbemileke Onamuti
(74) *Attorney, Agent, or Firm* — Osha Liang LLP

(57) ABSTRACT

A base station used in a mobile communications system which uses orthogonal frequency division multiplexing (OFDM) for downlink is disclosed. The base station includes: a unit which provides a reference signal; a unit which multiplexes a control signal and the reference signal, and generates a transmit symbol; and a unit which inverse Fourier transforms the transmit symbol and wirelessly transmits the transformed transmit symbol, wherein a first sequence including a random code sequence and a second sequence belonging to an orthogonal-code sequence group are multiplied with the reference signal, mutually different ones of the orthogonal code sequences are used in the respective multiple sectors belonging to the same cell, and different ones of the random code sequences are used in the respective two or more cells.

10 Claims, 13 Drawing Sheets

OTHER PUBLICATIONS

"Physical Channels and mapping of transport channels onto physical channels (FDD)"; 3GPP TS25.211; V3.12.0; Sep. 2002; pp. 24-25 (2 pages).

Chinese Office Action for Application No. 200780048934.0, mailed on Jun. 29, 2011 (12 pages).

* cited by examiner

FIG.6
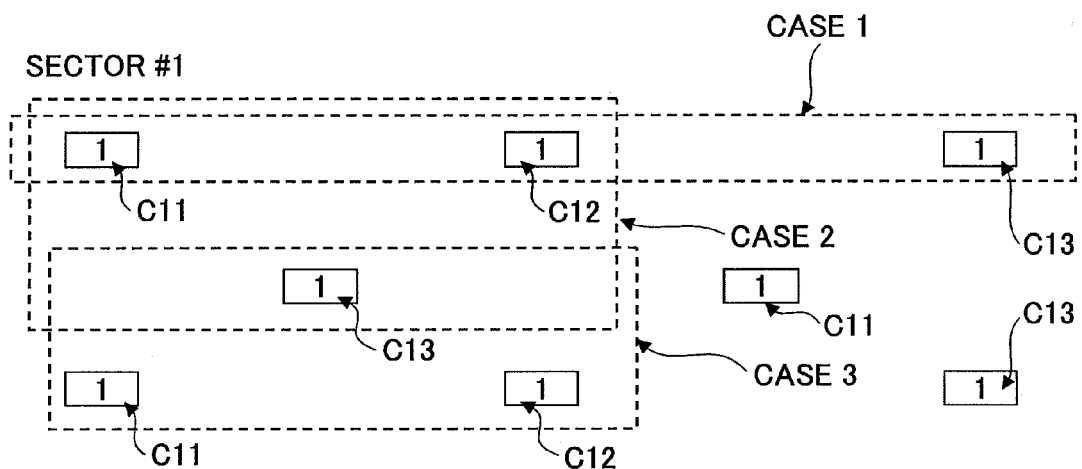
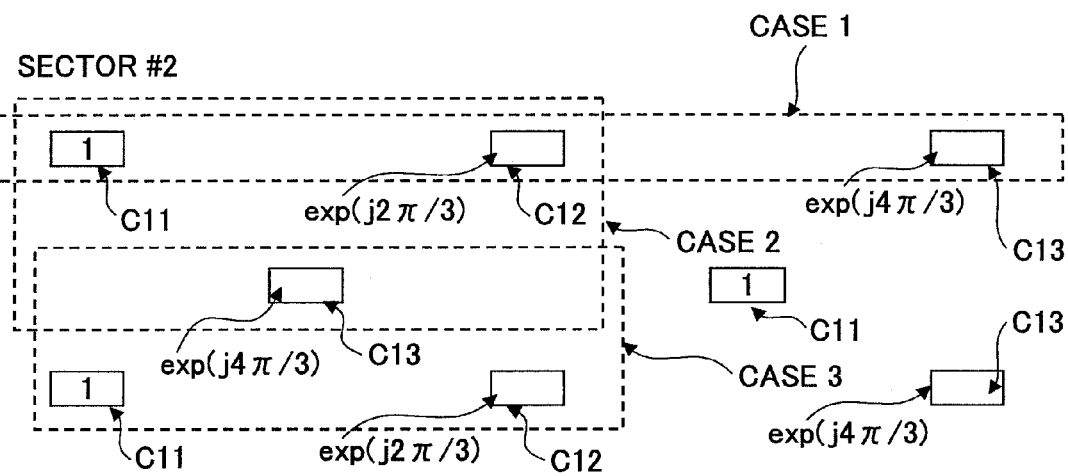
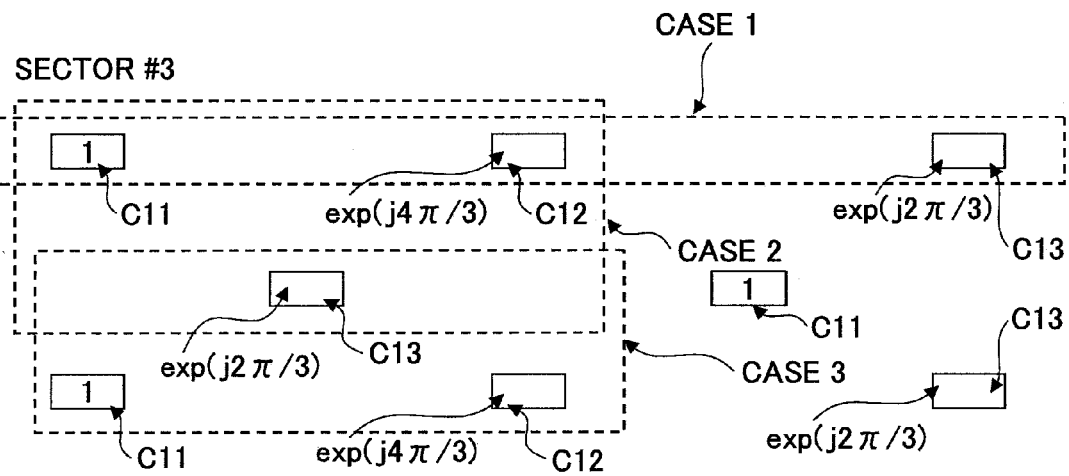

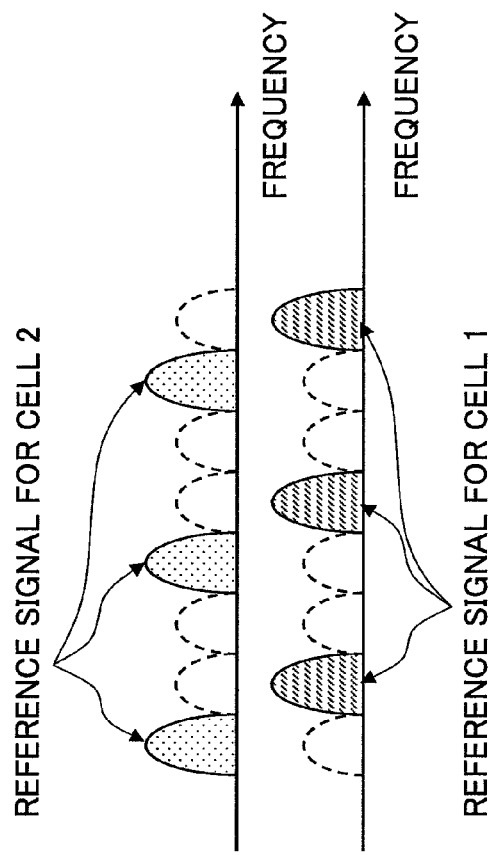
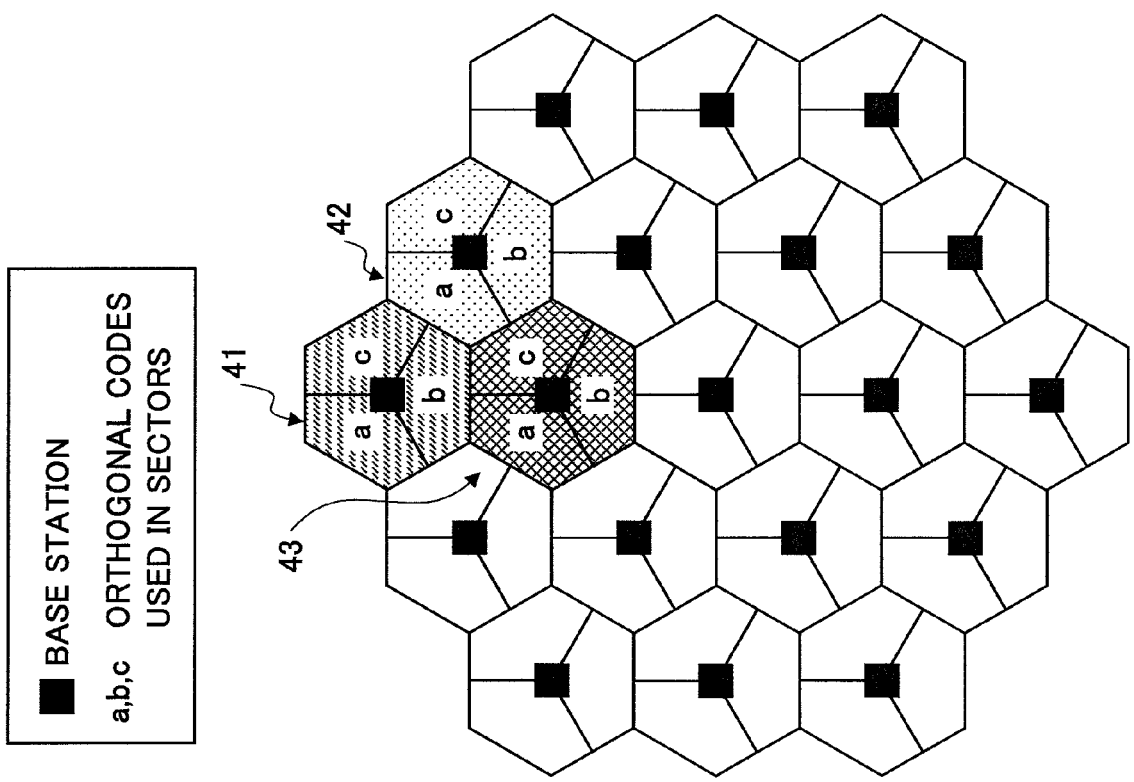
FIG.10

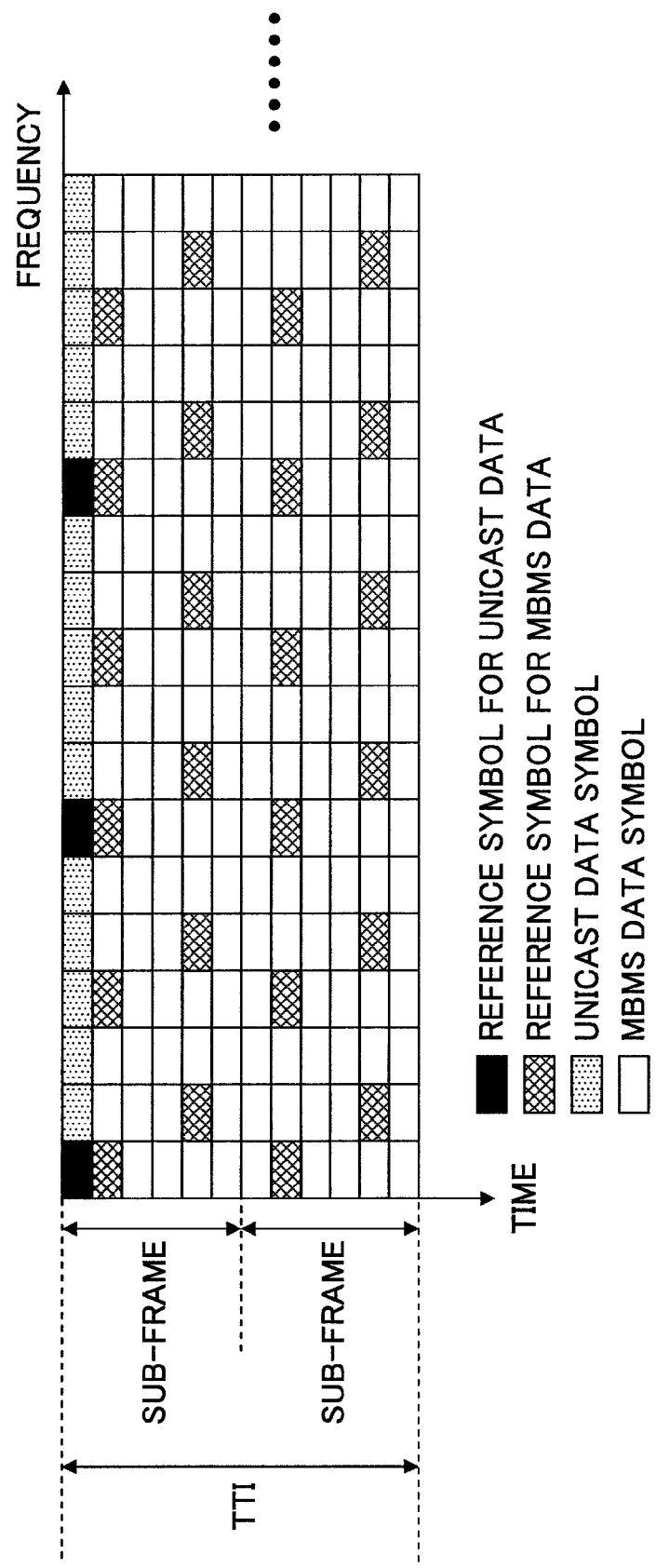

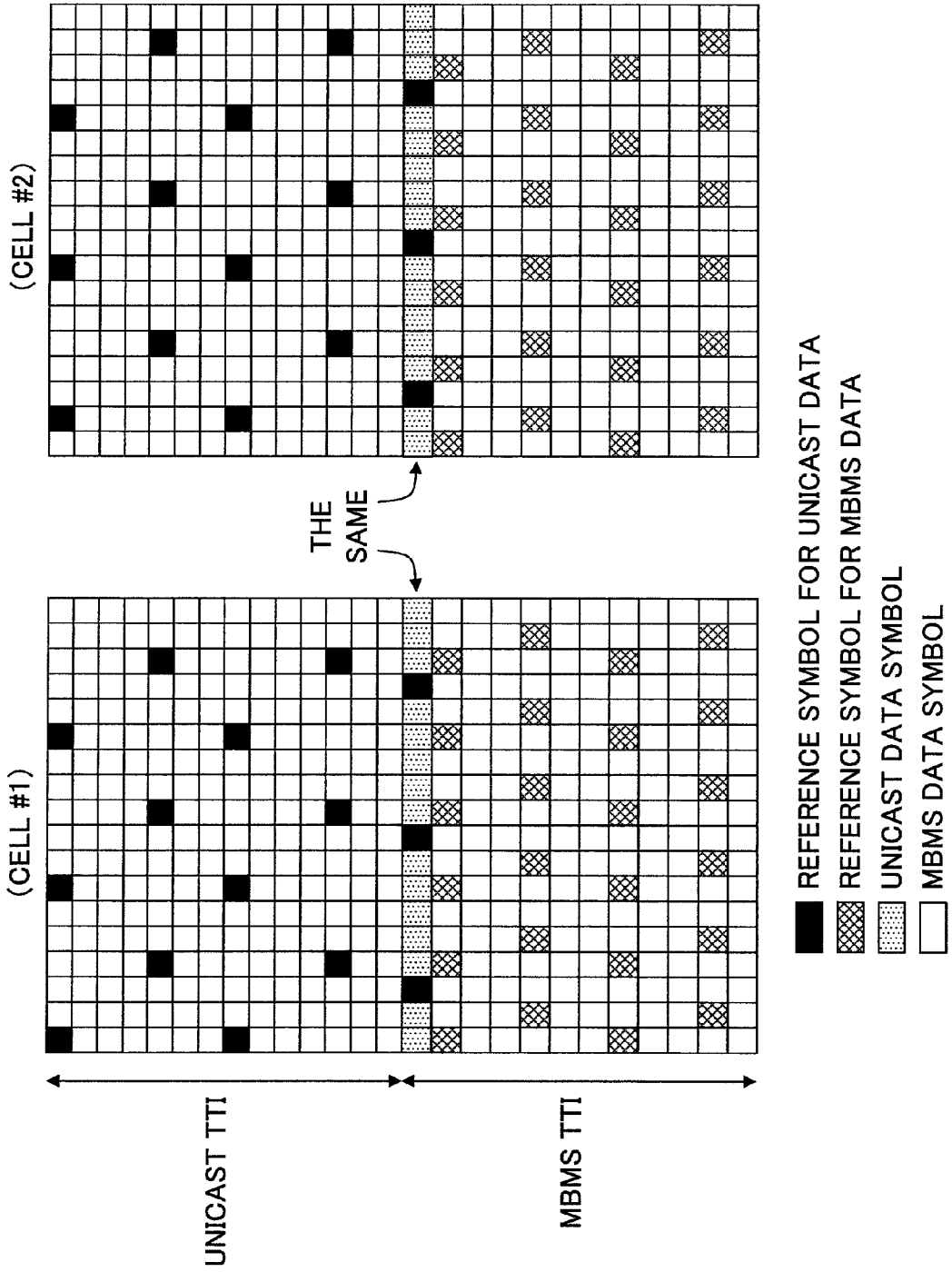

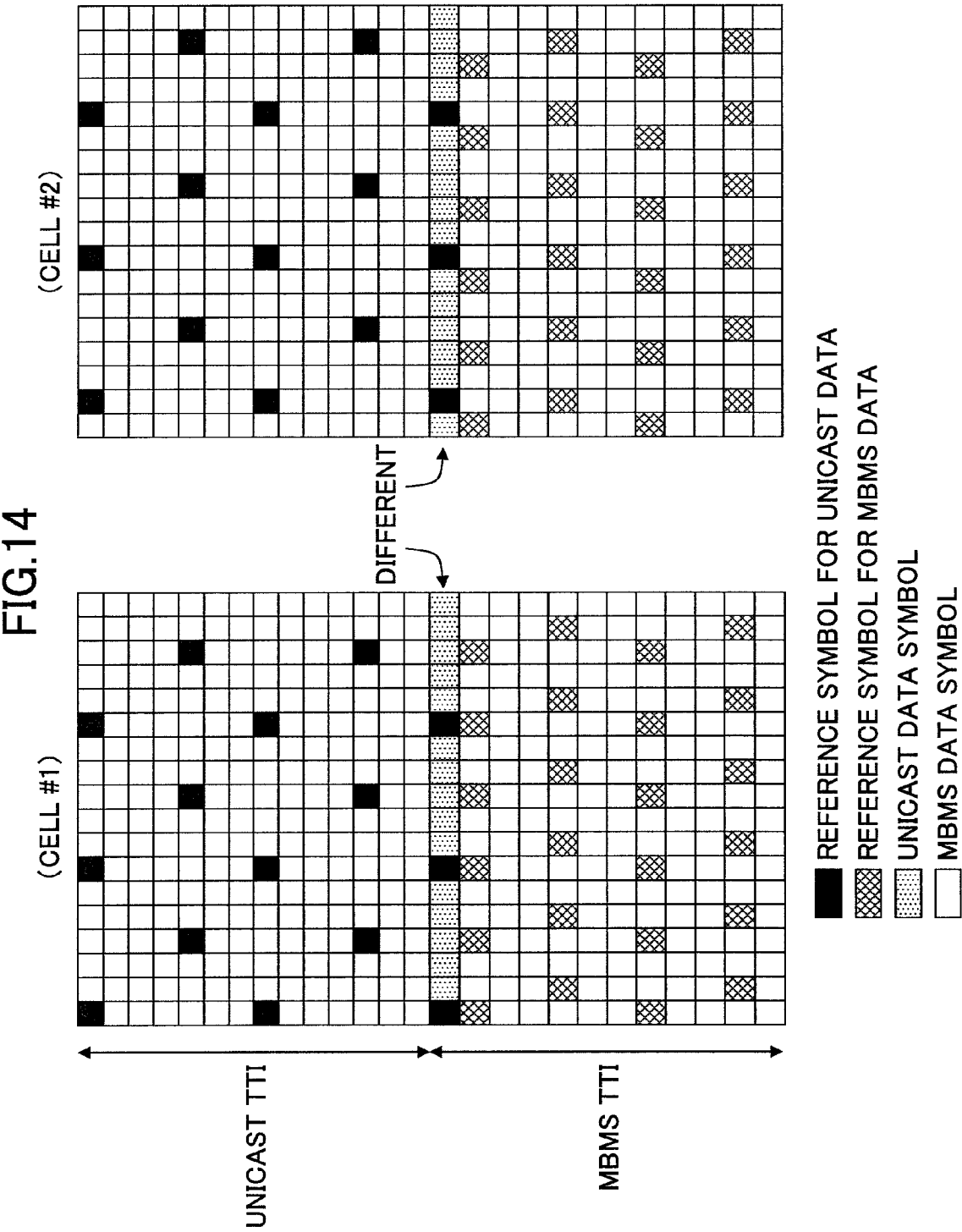

BASE STATION, USER APPARATUS, AND METHOD

BACKGROUND OF THE INVENTION

1. Field of the Invention

The present invention relates to a base station, a user apparatus and a method for use in a mobile communications system.

2. Description of the Related Art

In a mobile communications system, a reference signal is used for various purposes such as channel estimation, synchronous capturing, cell search, and receive-quality measurement, etc. The reference signal, which is a signal such that a bit value is known at the transmitter and at the receiver before communicating, may be called a known signal, pilot signal, training signal, etc. Preferably, the reference signal corresponds on a one-on-one basis to a cell ID which identifies a cell, so that it needs to be provided in multiple numbers. In an existing wideband code division multiple access (W-CDMA) system, 512 kinds of reference signals (code sequences) are provided for downlink. (See Non-patent document 1, for example.)

Non-Patent Document 1

3GPP, TS25.211 "Physical Channels and mapping of transport channels onto physical channels (FDD)"

SUMMARY OF THE INVENTION

Problem(s) to be Solved by the Invention

In the W-CDMA system, the reference signals include only random code sequences. While the correlation between the sequences may become relatively large, it does not become a major problem as the signal quality is primarily maintained by the electric power in a CDMA-based system.

However, in a future mobile communications system in which conducting downlink OFDM (orthogonal frequency division multiplexing) communications over a bandwidth which is wider than one in the present W-CDMA system is envisaged, significantly suppressing other-cell interference is desired. Providing the reference signals including only the random code sequences as in the present W-CDMA system is not the best solution as other-cell interference becomes relatively large.

The problem to be solved by the present invention is to provide a large number of reference signals so as to make it possible to effectively suppress other-cell interference in downlink.

Means for Solving the Problem

In an embodiment of the present invention, a first sequence including a random code sequence and a second sequence belonging to a certain orthogonal-code sequence group are multiplied to form the reference signal. Mutually different orthogonal code sequences are used in each of multiple sectors belonging to the same cell, and different random code sequences are used in two or more cells. Utilizing the orthogonal sequence for the reference signal makes it possible to effectively achieve interference suppression. The total number of sequences which may be provided as the reference signal is determined as the product of the number of random code sequences and the number of orthogonal sequences, so that the degree of freedom as to how the reference signal is provided becomes larger than in the related art. Distinguishing among sectors using the orthogonal code sequences in multiple mutually-synchronized cells makes it possible to make the reference signal orthogonal in a wide region over multiple cells.

The orthogonal code sequences may be expressed in a set of multiple phase factors with different phase angles.

The phase difference of phase factors applied to multiple sub-carrier components of simultaneously-transmitted reference signals may be an integer multiple of a predetermined first phase.

The phase difference of phase factors applied to the different sub-carrier components at different timings may be offset by a predetermined second phase.

The second sequence may be provided in a number which is more than the number of sectors included in one cell.

A first group of orthogonal code sequence may be provided for a first cell, a second group of orthogonal code sequence may be provided for a second cell, and the second group of orthogonal code sequence may be derived by rotating, by a predetermined amount, a phase angle used in the first orthogonal code sequence group.

A reference signal transmitted in a certain cell and a reference signal transmitted in another cell may be mapped to different sub-carriers.

A sub-frame for MBMS and a sub-frame for unicast may be time-multiplexed; for the sub-frame for unicast, a reference signal may be mapped to a different sub-carrier for each cell, and, for the sub-frame for MBMS, a reference signal may be mapped to a common sub-carrier for multiple cells.

A sub-frame for multicast broadcast multimedia service (MBMS) and a sub-frame for unicast may be time-multiplexed; for the sub-frame for the unicast, a reference signal may be mapped to different sub-carrier for each cell; for a part of the period of the sub-frame for MBMS, a reference signal may be mapped to different sub-carriers for each cell; and for a different part of the period of the sub-frame for the MBMS, a common reference signal may be mapped to multiple cells.

For facilitating the explanation, the present invention is described by breaking it down into a number of embodiments. However, the breakdown into the respective embodiments is not essential to the present invention, so that two or more embodiments may be used as needed.

Advantage of the Invention

The present invention makes it possible to provide a large number of reference signals so as to make it possible to effectively suppress other-cell interference in downlink.

BRIEF DESCRIPTION OF THE DRAWINGS

FIG. 6 is a diagram showing the relationship between the orthogonal code sequence and a random code sequence in the mapping example in FIG. 5;

FIG. 10 is a diagram showing how cell IDs are distinguished in an FDM scheme;

FIG. 12 is a diagram illustrating an example of channel mapping in sub-frames in which an MBMS channel is transmitted;

FIG. 13 is a diagram illustrating a mapping example of a reference signal; and

FIG. 14 is a diagram illustrating another mapping example of the reference signal.

DESCRIPTION OF THE PREFERRED EMBODIMENTS

Description of Notations

Figure 1:
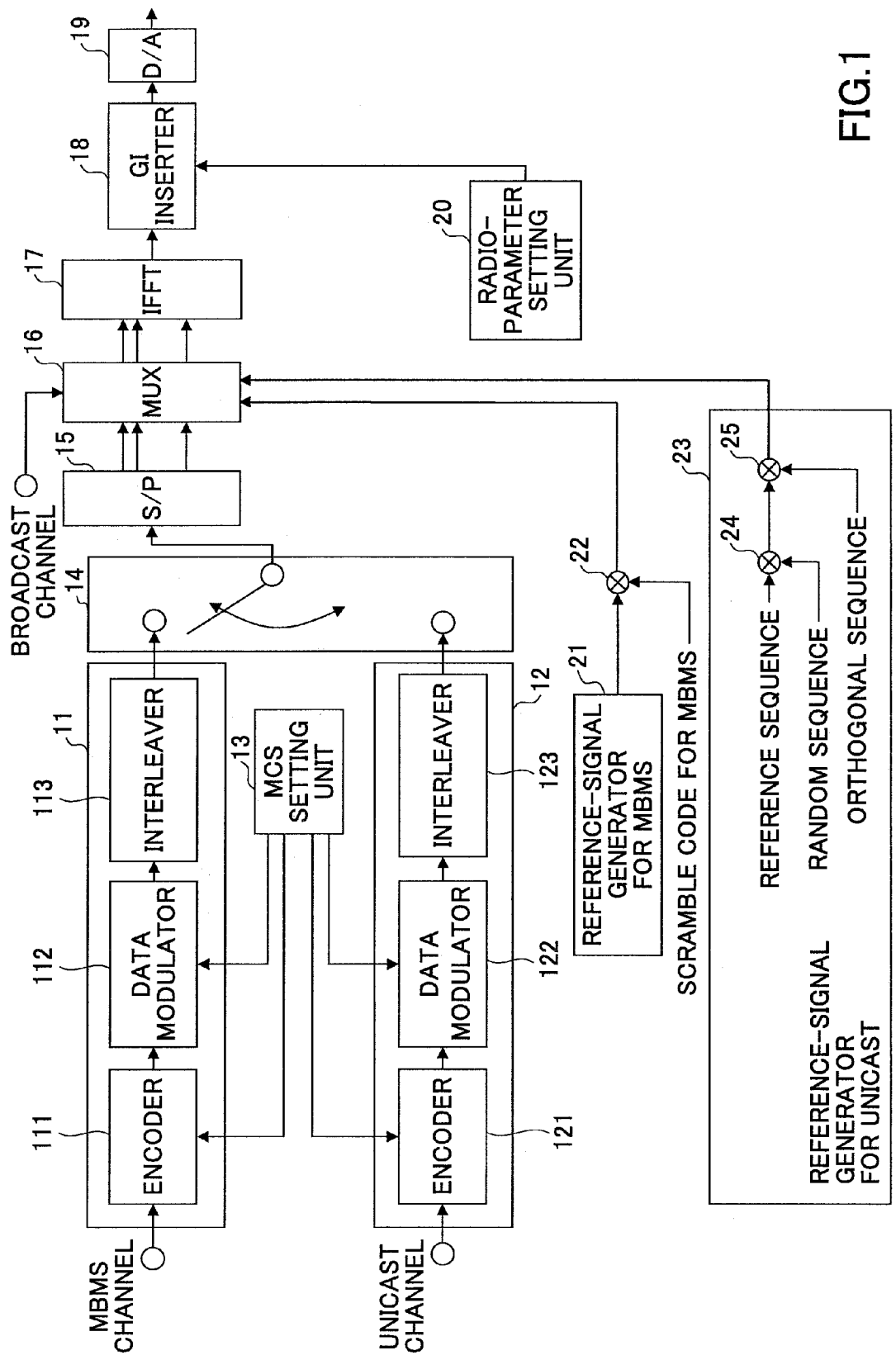
FIG. 1 is a block diagram of a base station according to an embodiment of the present invention.

11 MBMS processor; 111 Turbo encoder; 112 data modulator; 113 interleaver; 12 unicast data processor; 121 Turbo encoder; 122 data modulator; 123 interleaver; 13 MCS setting unit; 14 first multiplexer; 15 serial/parallel converter (S/P); 16 second multiplexer (MUX); 17 inverse fast Fourier transformer (IFFT); 18 guard-interval inserter; 19 digital/analog converter (D/A); 20 radio-parameter setting unit; 21 reference-signal generator for MBMS; 23 reference-signal generator for unicast; 22, 24, 25 multiplier; 202 analog/digital converter (A/D); 204 guard-interval remover; 206 fast Fourier transformer (FFT); 208 demultiplexer (DeMUX); 210, 212 multiplier; 214 channel estimator; 216 demodulator

BEST MODE OF CARRYING OUT THE INVENTION

In an embodiment of the present invention, a first sequence which includes a random code sequence and a second sequence belonging to an orthogonal-code sequence group are multiplied to form a reference signal. Mutually different orthogonal code sequences are used in each of multiple sectors belonging to the same cell, and different random code sequences are used in two or more cells. Utilizing the orthogonal sequence for the reference signal makes it possible to effectively achieve interference suppression. The total number of sequences which may be provided as the reference signal is determined as a product of the number of random code sequences and the number of orthogonal sequences, so that the degree of freedom as to how the reference signal is provided becomes larger than in the related art. Distinguishing among sectors using the orthogonal code sequences in multiple mutually-synchronized cells makes it possible to make the reference signal orthogonal in a wide region over multiple cells.

The orthogonal code sequences may be expressed as a set of multiple phase factors of different phase angles.

A phase difference of phase factors applied to multiple sub-carrier components of reference signals transmitted simultaneously may be an integer multiple of a predetermined first phase.

A phase difference of phase factors applied at a different timing and to different sub-carrier components may be offset by a predetermined second phase.

The second phase may be provided in a number which is larger than the number of sectors in one cell.

A first group of orthogonal code sequences may be provided for the first cell, a second group of orthogonal code sequences may be provided for the second cell, and the second group of orthogonal code sequences may be derived by rotating a phase angle used in the first group of orthogonal code sequences by a predetermined amount.

A reference signal transmitted in a cell, and a reference signal transmitted in another cell may be mapped to different sub-carriers.

A sub-frame for MBMS and a sub-frame for unicast may be time-multiplexed with a reference signal being mapped, for the sub-frame for the unicast, to a sub-carrier which is different from one cell to another: a reference signal being mapped, for one part of a period of the sub-frame for the MBMS, to a sub-carrier which is different from one cell to another; and a reference signal being mapped, for another part of a period of the sub-frame for the MBMS, to a sub-carrier which is common to multiple cells.

The present invention has been described by breaking down into a number of embodiments for convenience of explanation. However, the breakdown of each of the embodiments is not essential to the present invention, so that two or more embodiments may be used as required.

Embodiment 1

FIG. 1 is a schematic block diagram of a base station according to an embodiment of the present invention. The base station has an MBMS processor 11, an unicast data processor 12, an MCS setting unit 13, a first multiplexer 14, a serial/parallel converter (S/P) 15, a second multiplexer (MUX) 16, an inverse fast Fourier transformer (IFFT) 17, a guard-interval inserter 18, a digital/analog converter (D/A) 19, a radio-parameter setting unit 20, a reference-signal generator for MBMS 21, a multiplier 22, and a reference-signal generator for unicast 23. The MBMS processor 11 has a channel-Turbo processor 111, a data modulator 112, and an interleaver 113. The unicast-data processor 12 has a Turbo encoder 121, a data modulator 122, and an interleaver 123. The reference-signal generator for unicast 23 has multipliers 24 and 25.

The MBMS processor 11 performs processing related to a multicast broadcast multimedia service (MBMS) channel, which includes multimedia information broadcasts to a large number of specified or unspecified users, and may include voice, character, still and video image, and various other contents.

The encoder 111 performs channel encoding in order to increase the error tolerance of the MBMS channel. Encoding may be performed using various schemes such as convolution encoding and Turbo encoding that are well known in the art. The channel encoding rate may be fixed, or changed according to an instruction from the MCS setting unit 13, as described below.

The data modulator 112 modulates the MBMS channel data using any appropriate modulation scheme such as QPSK, 16 QAM, or 64 QAM. The modulation scheme may be fixed, or changed according to an instruction from the MCS setting unit 13, as described below.

The interleaver 113 changes the order of the data included in the MBMS channel according to a predetermined pattern.

The unicast data processor 12 performs a process related to a channel destined for a specific individual user.

The encoder 121 performs encoding in order to increase the error tolerance of the unicast channel. Encoding may be performed using various schemes such as convolution encoding and Turbo encoding that are well known in the art. In the present embodiment, AMC (adaptive modulation and encoding) control is performed with respect to the unicast channel, with the channel encoding rate being changed adaptively according to an instruction from the MCS setting unit 13.

The data modulator 122 modulates the unicast channel data using any appropriate modulation scheme such as QPSK, 16 QAM, or 64 QAM. In the present embodiment, AMC control is performed with respect to the unicast channel, with the modulation scheme being changed adaptively according to an instruction from the MCS setting unit 13.

The interleaver 123 changes the order of the data included in the unicast data according to a predetermined pattern.

While FIG. 1 does not expressly show processing elements for the control channel, the same process as the processor 11 or 12 is also performed for the control channel. AMC control does not need to be performed for the control channel.

The MCS setting section 13 instructs each processing element to change, as required, a combination of a modulation scheme and an encoding rate that is used for the MBMS channel, and a combination of a modulation scheme and an encoding rate that is used for the unicast channel. The combination of the modulation scheme and the encoding rate is specified by a number (an MCS number), which indicates what the combination is.

The first multiplexer 14 time-multiplexes the MBMS channel and the unicast channel in the same frequency band.

The serial-to-parallel (S/P) converter 15 converts a serial signal stream to parallel signal sequences, the number of which may be determined in accordance with the number of sub-carriers.

The second multiplexer (MUX) 16 multiplexes multiple data sequences showing output signals from the first multiplexer 14, a reference signal for the MBMS, a reference signal for the unicast, and a broadcast channel. The multiplexing may be performed by any one scheme of time multiplexing, frequency multiplexing, and time and frequency multiplexing.

The fast inverse Fourier transformer (IFFT) 17 inverse fast Fourier transforms an input signal, and modulates the signal using OFDM.

The guard-interval inserter 18 adds guard intervals to the OFDM-modulated symbols to create transmit symbols. As is well known, a series of data including head data of a symbol to be transmitted is replicated to create the guard interval, which is appended to the tail to create a transmit symbol. Alternatively, a series of data including tail data of a symbol to be transmitted is replicated to create the guard interval, which is appended to the head to create a transmit symbol.

The digital-to-analog converter (D/A) 19 converts a baseband digital signal to an analog signal.

The radio-parameter setting unit 20 sets radio parameters used in communications. The radio parameter (group), which includes information specifying the format of an OFDM symbol, may include a group of information items specifying values such as a guard interval period $T_{GI}$, an effective symbol period, a proportion the guard interval takes up in one symbol, and sub carrier interval $\Delta f$. The effective symbol period is equal to the inverse of the sub carrier interval, or $1/\Delta f$.

The radio-parameter setting unit 20 sets appropriate radio parameter groups according to the communications condition or in response to instructions from other apparatuses. For example, the radio-parameter setting unit 20 may make proper use of the radio parameter groups to be used, according to whether what is to be transmitted is a unicast channel or an MBMS channel. For example, a radio parameter group specifying a shorter guard interval may be used for the unicast channel, while a radio parameter group specifying a longer guard interval may be used for the MBMS channel. The radio-parameter setting unit 20 may compute and derive an appropriate radio parameter group each time, or multiple sets of radio parameters may be stored in a memory in advance, out of which sets a set of radio parameters may be selected as needed.

The reference signal generator for MBMS 21 multiplies a scrambling code for MBMS by a certain reference signal, and provides a reference signal for the MBMS channel.

The reference signal generator for unicast 23 multiplies a reference sequence, a random code sequence, which is a first sequence, and an orthogonal code sequence, which is a second sequence, to provide a reference signal for unicast channel. How the reference signal is set for a cell and for a sector is described below with reference to FIG. 4, etc.

Figure 2:
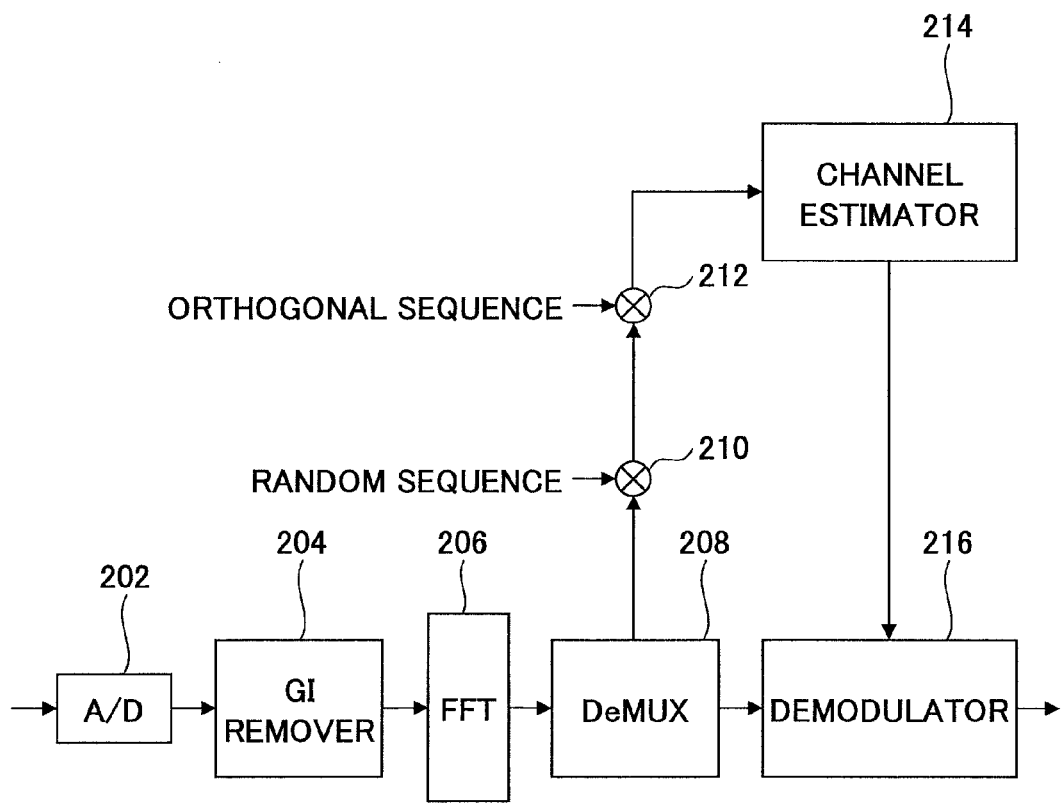
FIG. 2 is a block diagram of a user apparatus according to an embodiment of the present invention.

FIG. 2 shows a user apparatus according to an embodiment of the present invention. FIG. 2 shows a analog/digital converter (A/D) 202, a guard-interval remover 204, a fast Fourier transformer (FFT) 206, a demultiplexer (DeMUX) 208, multipliers 210, 212, a channel estimator 214, and a demodulator 216.

The analog/digital converter (A/D) 202 converts a received baseband analog signal to a digital signal.

The guard-interval remover 204 removes guard intervals from received symbols, and keeps effective symbol portions.

The fast Fourier transformer (FFT) 206 fast Fourier transforms a signal input, and demodulates the signal using OFDM.

The demultiplexer (DeMUX) 208 demultiplexes a reference signal and a data signal (user data or control data) from the received signal.

The multipliers 210 and 212 multiply the received reference signal, a random code sequence which is a first sequence, and an orthogonal code sequence which is a second sequence. While not shown for simplifying the illustration, when an MBMS channel is received, a scramble code for MBMS is used as a multiplier.

The channel estimator 214 performs channel estimation based on the multiplied reference signal, and determines what channel compensation is to be performed on a received data signal.

The demodulator 216 compensates the data signal based on the channel estimation result, and reconstructs a data signal transmitted/received.

The MBMS channel input to the MBMS processor and the unicast channel input to the unicast channel processor (FIG. 1) are channel coded and data modulated in appropriate encoding rates and modulation schemes which are designated by the individual MCS number, and are, respectively, time-multiplexed after interleaving. Time multiplexing may be performed in various units of time, for example in units of radio frames, or in units of sub-frames which make up a radio frame.

Figure 3:
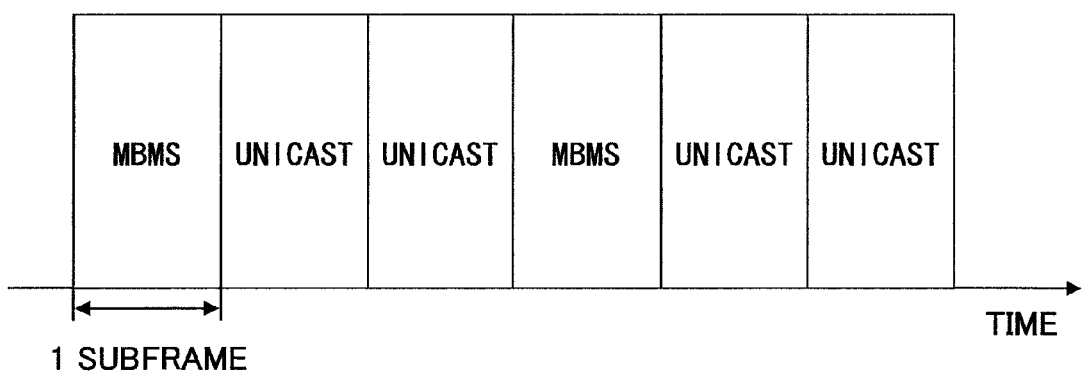
FIG. 3 is a diagram illustrating how unicast channels and MBMS channels are time-multiplexed.

FIG. 3 is an example illustrating time-multiplexing in units of sub frames. As an example, a sub frame may be equal to a transmission time interval (TTI) such as 1.0 ms. The time-multiplexed channel is multiplexed with a reference signal or a broadcast channel, as required, after which it is inverse fast Fourier transformed and OFDM modulated. The modulated symbols have appended guard intervals to output baseband OFDM symbols, which are converted to an analog signal, which is wirelessly transmitted via a transmit antenna. At the receiver, the analog signal is converted to a digital signal, the guard intervals are removed, the Fourier transform is performed, and OFDM demodulation is performed. The data signal is compensated for based on the channel estimation result, and the transmitted/received data signal is restored.

Figure 4:
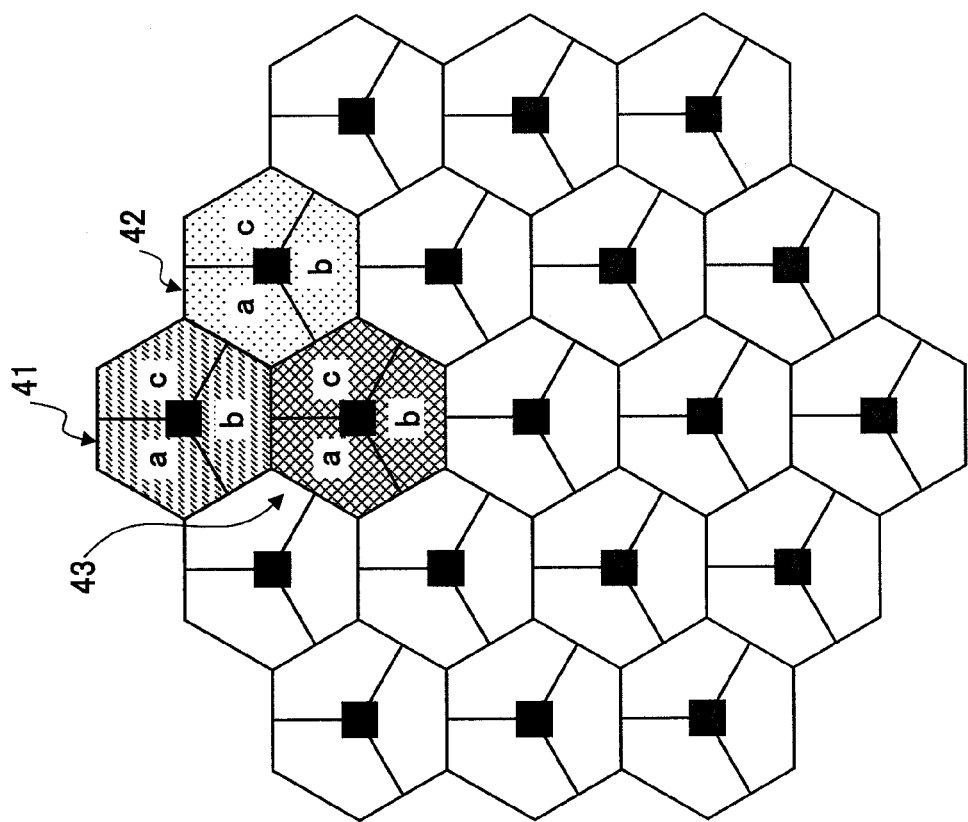
FIG. 4 is a diagram illustrating how a reference signal is used according to an embodiment of the present invention.

FIG. 4 shows cells and sectors using a reference signal according to an embodiment of the invention. For simplifying the illustration, three cells and nine sectors are explained as a representative example, but the explanation would be similar for any other numbers of the cells and sectors. In the present embodiment, a random code sequence (a first sequence) and an orthogonal code sequence (a second sequence) are multiplied by a certain reference sequence to provide a reference signal. A cell identifier for identifying a cell (a cell ID), which corresponds on a one-to-one basis to a reference signal, are provided in a number amounting to the number of combinations of the random code sequence and the orthogonal code sequence. For example, providing 170 of the random code sequences and three of the orthogonal code sequences makes it possible to provide a total of 510 reference signals and cell IDs. The illustrated cells appear differently as random code sequences are used which differ from one cell to another. a, b, c are three orthogonal code sequences which are selected from a certain group of orthogonal code sequences. Any cell uses the orthogonal code sequences a, b, c as common to sectors. However, random code sequences which differ from one cell to another are used, so that, as a whole, the reference signals differ from one sector to another. Sectors included in the same cell are mutually synchronized, so that using the orthogonal codes a, b, c makes it possible to make intersector interference substantially zero. Each cell is generally non-synchronous and has a degree of interference. In the present embodiment, the inter-sector interference within the same cell is substantially zero, so that the amount of interference as a whole is reduced.

Figure 5:
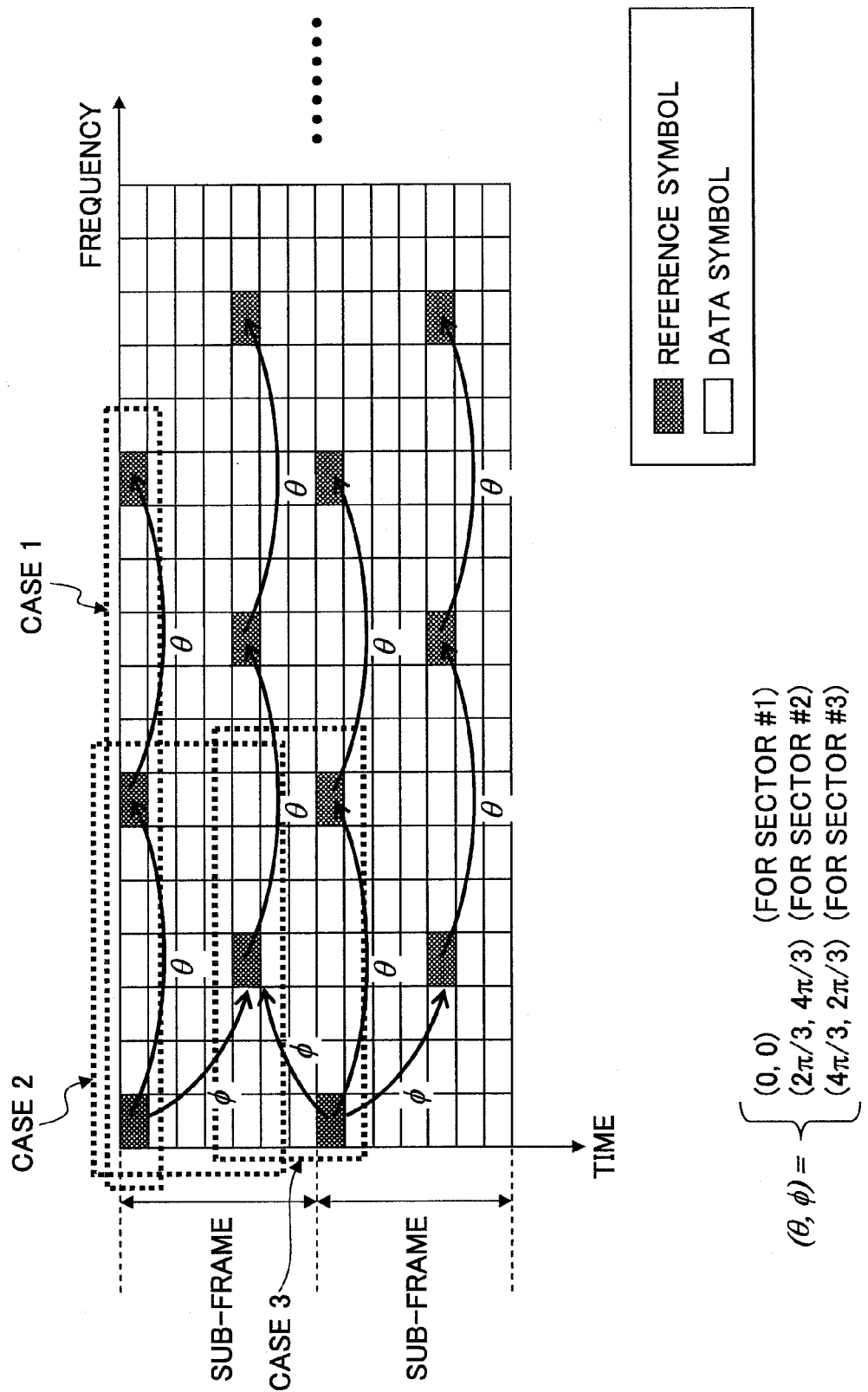
FIG. 5 is a diagram illustrating a specific example of an orthogonal code sequence and an example of mapping.

FIG. 5 is a specific example of orthogonal code sequences and an example of mapping. In the illustrated example, a sequence group including three orthogonal code sequences:

(1, 1, 1),
(1, exp(j2π/3), exp(j4π/3)
(1, exp(j2π/3), exp(j4π/3)) are used to perform a three-sector orthogonalization. In the mapping example shown in FIG. 5, a mapping scheme is designed such that it makes sufficient use of the orthogonality. The reference signal, which is mapped to time and frequency as shown, is multiplied with the random code sequence and the orthogonal code sequence. One sub-frame includes seven symbol periods. Multiple frequency components of the reference signal that are simultaneously transmitted in a certain symbol period have phase-angle components which mutually differ by nθ (any integer multiple of θ). The components transmitted in different symbol periods in the same sub-frame have phase-angle components which mutually differ by (θ+nθ). θ=0 and φ=0 for the first sector, θ=exp(j2π/3) and φ=exp(j4π/3) for the second sector, and θ=exp(j4π/3) and φ=exp(j2π/3) for the third sector. When mapped as shown, any of three-component sets enclosed in case 1, case 2, and case 3 makes up one orthogonal code sequence.

FIG. 6, which shows a mapping example similar to FIG. 5, specifically shows each component $c_{1,j}$(j=1,2,3) of the random code sequence and each component (1, exp(j2π/3), exp(j4π/3)) of the orthogonal code sequence that are applied to the reference signal. It is envisaged that the random code sequence for the first cell (e.g., 41 in FIG. 4) is $(c_{11}, c_{12}, c_{13})$, the random code sequence for the second cell (e.g., 42 in FIG. 4) is $(c_{21}, c_{22}, c_{23})$, and the random code sequence for the third cell (e.g., 43 in FIG. 4) is $(C_{31}, C_{32}, C_{33})$. FIG. 6 shows a reference signal transmitted by sectors #1, #2, and #3 within the first cell. For combinations of any two sectors, the inner product (the correlation) among three components within the case 1, 2, 3 frame becomes zero.

Embodiment 2

In the first embodiment, it is assumed that the cells are mutually non-synchronous with orthogonal code sequences provided in a number amounting to the number of sectors per cell. In the second embodiment of the present invention, more orthogonal code sequences are provided, and common random code sequences are used in a number of cells.

Figure 7:
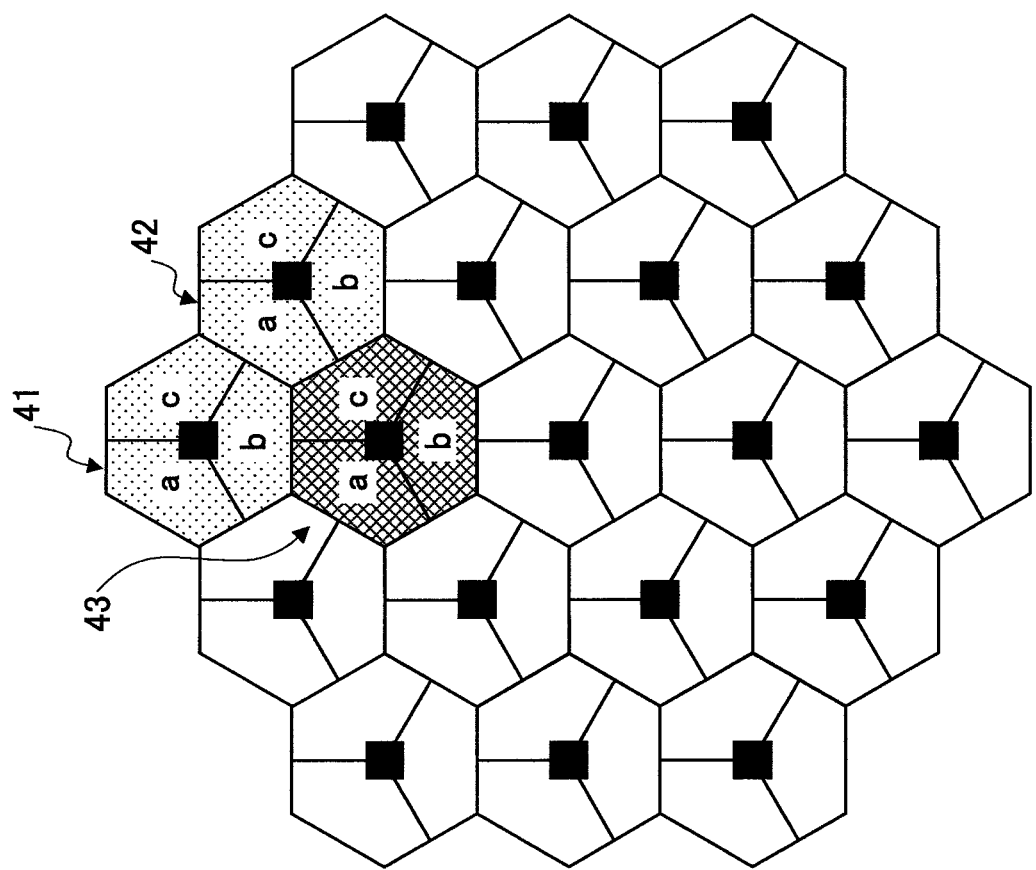
FIG. 7 is a diagram showing an example of distinguishing among sectors using orthogonal code sequences in synchronized cells.

FIG. 7 shows how the same random code sequence is used in the first cell 41 and the second cell 42. In this case, it is assumed that the first cell 41 and the second cell 42 are synchronized. In this way, the reference signals are made orthogonal in a wider geographical range over two cells. For example, a sector using an orthogonal code c in the first cell 41 benefits from orthogonalization with respect to not only a neighboring sector within the first cell 41, but also two sectors using a and b in the second cell 42. However, sectors using the same random code sequence and the same orthogonal code sequence end up co-existing within the first and second cells, leading to a concern that they may not be appropriately distinguished. In the present embodiment, more orthogonal code sequences are provided, thus overcoming such a concern.

Figure 8:
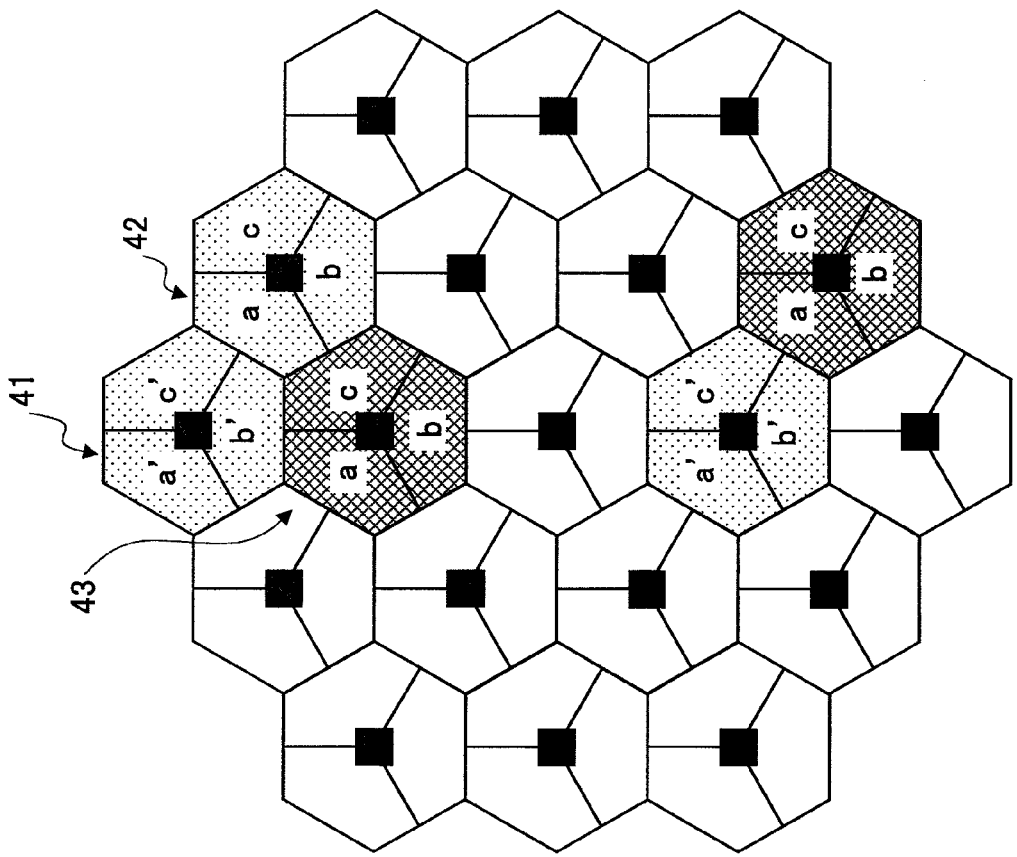
FIG. 8 is a diagram showing another example of distinguishing among the sectors using the orthogonal code sequences in the synchronized cells.

FIG. 8 shows cells and sectors using a reference signal according to the present embodiment. Not only a, b, c but also a', b', c' denote orthogonal code sequences. Doubling the number of orthogonal code sequences and halving the number of random code sequences make the total number of reference signals which may be provided the same as in the first embodiment. However, the present embodiment, with more synchronized cells, and a broader geographical region which may benefit from orthogonality, is advantageous for suppressing interference.

Figure 9:
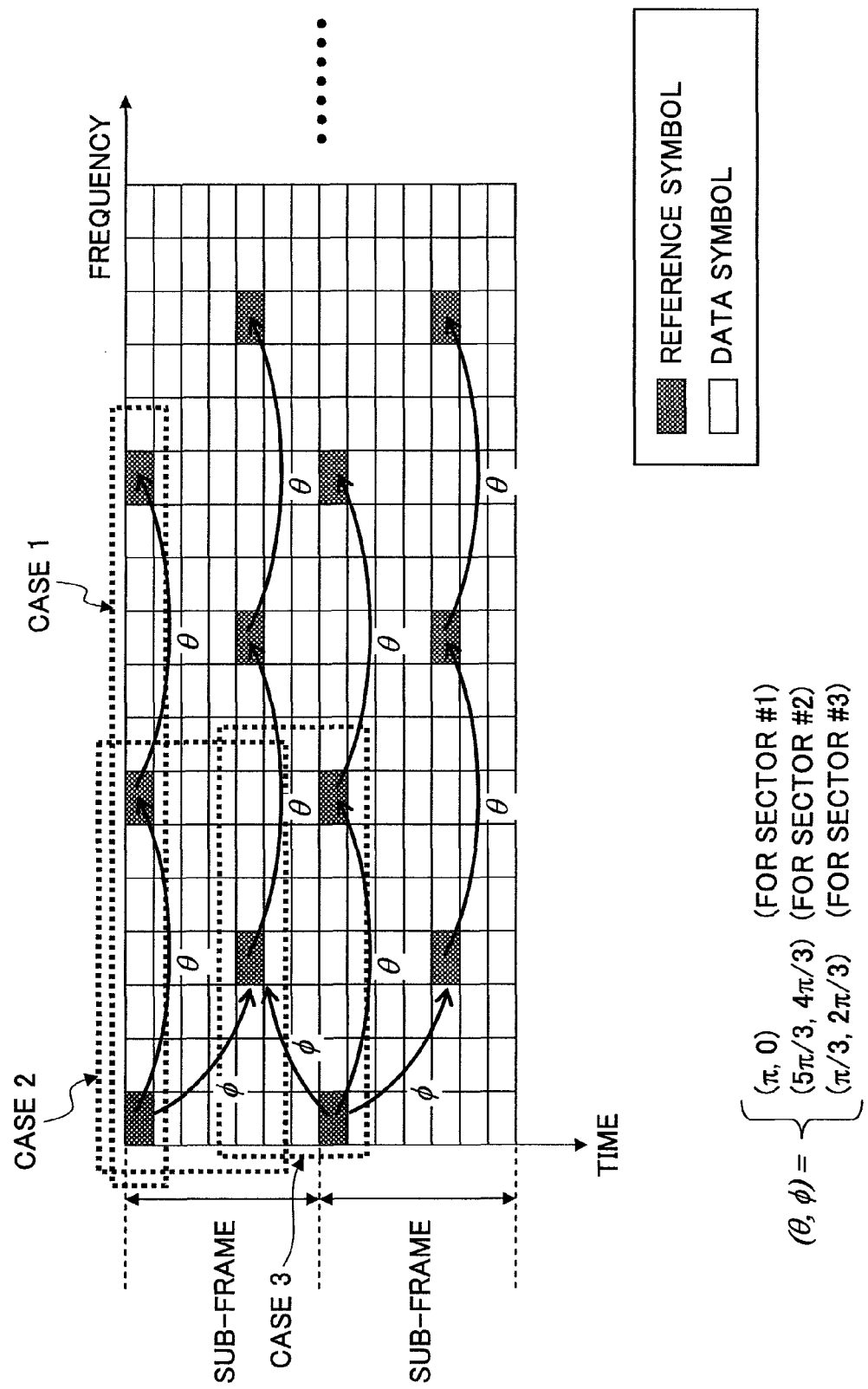
FIG. 9 is a diagram illustrating a specific example of the orthogonal code sequence and an example of mapping.

FIG. 9 shows a specific example of a different orthogonal code sequence. The above-described a, b, c may be collated to FIG. 5, and FIG. 9 may be associated with the orthogonal code sequences a', b', c'. The mapping position of the reference signal is common for FIGS. 5 and 9. The orthogonal code sequence shown in FIG. 9 has a phase angle which is different from what is shown in FIG. 5. Replacing θ with (θ+π) in the orthogonal code sequence in FIG. 5 leads to obtaining the orthogonal code sequence as shown in FIG. 9. In this way, a number of orthogonal code sequences may be obtained with a relatively simple method.

Embodiment 3

In the second embodiment, the problem that the same cell ID is assigned to spatially-neighboring locations as shown in FIG. 7 is overcome by increasing the number of orthogonal code sequences.

As shown in FIG. 10, in the third embodiment of the present invention, the reference signals are distinguished using frequency-division multiplexing (FDM) instead of increasing the number of orthogonal sequences. Mapping, to a frequency to which a reference signal for a certain sector is mapped, a data signal of a different sector could cause them to interfere with each other. Therefore, it is preferred that the present embodiment is used in a condition with such relatively high availability of radio resources that the situation as described above does not occur.

Embodiment 4

Now, channels transmitted to a user apparatus from a base station include not only a unicast channel, but also an MBMS channel. MBMS channels having the same contents are transmitted from multiple cells. The individual user apparatuses receive the MBMS channels having the same contents that are transmitted from multiple cells. The received MBMS channels form a large number of incoming waves or paths depending on the length of radio propagation paths. If the delay difference of the incoming waves falls within the range of the guard interval due to the characteristics of an OFDM symbol, the multiple incoming waves may be combined without intersymbol interference (soft-combined), making it possible to improve the receive quality as a result of path-diversity effects. Therefore, it is preferred that the guard-interval length for the MBMS channel is set longer than the guard-interval length for the unicast channel.

Figure 11:
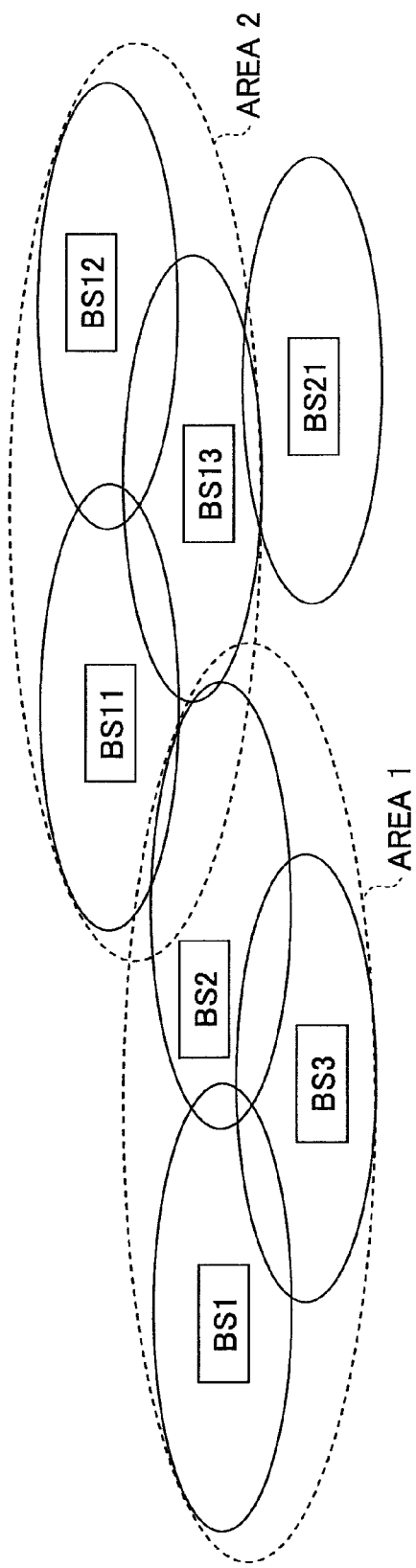
FIG. 11 is a diagram showing how the same MBMS channel is transmitted for each area.

FIG. 11 shows seven cells. Three cells by base stations 1, 2, and 3 (BS1, BS2, and BS3) make up one area 1 wherein the same MBMS channel is transmitted. Three cells by base stations 11, 12, and 13 (BS11, BS12, and BS13) also make up one area 2 wherein the same MBMS channel is also transmitted in the area 2. The MBMS channels transmitted in the area 1 and 2 need not be the same (they are generally different.) In order to distinguish the areas, a scramble code is provided per area in which the same MBMS channel is transmitted. In cells within the same area, the same scramble codes may be multiplied with the MBMS channel.

FIG. 12 is a diagram showing an example of channel mapping in a sub-frame in which an MBMS channel is transmitted. Two sub-frames are included in one transmit timing interval (TTI), each sub-frame including seven symbol periods. In a head symbol period, a control signal related to a unicast channel and a reference signal for the control signal (a reference symbol for unicast) are frequency-multiplexed. The control signal may include acknowledgment information (ACK/NACK) for a previous uplink data channel, for example. During and after the second symbol period, data for an MBMS channel (MBMS data) and a reference symbol for the MBMS channel are multiplexed in time and frequency directions.

Therefore, the contents at least during and after the second symbol period should be made common across all the cells. The following scheme is possible when transmitting unicast and MBMS channels using the above-described third embodiment.

As shown in FIG. 13, in the first scheme, the reference symbol position within the TTI for unicast differs from one cell to another, but the reference symbol positions within the TTI for MBMS are made common across all the cells.

As shown in FIG. 14, in the second scheme, the reference symbol position within the first symbol period not only for the TTI for unicast but also for the TTI for MBMS differs from one cell to another, while the reference symbol positions for the second symbol period and beyond for the TTI for MBMS are made common across all cells.

As shown in FIGS. 12-14, information sets (a reference symbol and a data symbol) related to the unicast channel are concentrated in the head symbol period, so that information for MBMS, as well as other information may be temporally divided, making it possible to facilitate signal processing.

As described above, while the present invention is described with reference to specific embodiments, the respective embodiments are merely exemplary, so that a skilled person will understand variations, modifications, alternatives, and replacements. While specific numerical value examples are used to facilitate understanding of the present invention, such numerical values are merely examples, so that any appropriate value may be used unless specified otherwise. Breakdown of the respective embodiments are not essential to the present invention, so that two or more embodiments may be used as needed. For convenience of explanation, while the apparatus according to the embodiments of the present invention is explained using functional block diagrams, such an apparatus as described above may be implemented in hardware, software, or a combination thereof. The present invention is not limited to the above embodiments, so that variations, modifications, alternatives, and replacements are included in the present invention without departing from the spirit of the present invention.

The present international application claims priority based on Japanese Patent Application No. 2006-298311 filed Nov. 1, 2006, the entire contents of which are hereby incorporated by reference.

The invention claimed is:

1. A base station used in a mobile communications system which uses orthogonal frequency division multiplexing (OFDM) for downlink, comprising:
    a unit which provides a control signal;
    a unit which provides a reference signal;
    a unit which multiplexes the control signal and the reference signal, and generates a transmit symbol; and
    a unit which inverse Fourier transforms the transmit symbol and wirelessly transmits the transformed transmit symbol,
    wherein a first sequence including a random code sequence and a second sequence belonging to an orthogonal-code sequence group are multiplied with the reference signal, mutually different one of the orthogonal code sequences are used in respective multiple sectors belonging to a same cell, and different ones of the random code sequences are used in respective two or more of the cells,
    wherein a reference signal transmitted in one sector among the multiple sectors and a reference signal transmitted in another sector among the multiple sectors are time and frequency mapped to different sub-carriers using the OFDM,
    wherein the reference signal transmitted in the one sector and the reference signal transmitted in the another sector are distinguished using frequency division multiplexing,
    wherein a sub-frame for multicast broadcast multimedia service (MBMS) and a sub-frame for unicast are time-multiplexed,
    wherein, for a sub-frame for unicast, the reference signal transmitted in one sector and the reference signal transmitted in another sector are time and frequency mapped to a different sub-carrier for each of the cells, and
    wherein, for a sub-frame for MBMS, the reference signal transmitted in one sector and the reference signal transmitted in another sector are time and frequency mapped to a common sub-carrier for multiple of the cells.

2. The base station as claimed in claim 1, wherein the orthogonal code sequences are expressed in a set of multiple phase factors with different phase angles.

3. The base station as claimed in claim 2, wherein
    the phase difference of phase factors applied to multiple sub-carrier components of simultaneously-transmitted reference signals is an integer multiple of a predetermined first phase.

4. The base station as claimed in claim 2, wherein
    a first orthogonal code sequence is provided for a first cell, a second orthogonal code sequence is provided for a second cell, and the second orthogonal code sequence is derived by rotating, by a predetermined amount, a phase angle used in the first orthogonal code sequence.

5. The base station as claimed in claim 3, wherein the phase difference of phase factors applied to the different sub-carrier components at different timings is offset by a predetermined second phase.

6. The base station as claimed in claim 1, wherein the second sequence is provided in a number which is more than the number of sectors included in one cell.

7. The base station as claimed in claim 1, wherein
a sub-frame for multicast broadcast multimedia service (MBMS) and a sub-frame for unicast are time-multiplexed,
for the sub-frame for the unicast, the respective reference signals are time and frequency mapped to different sub-carriers for each of the cells,
for a part of the period of the sub-frame for MBMS, the respective reference signals are time and frequency mapped to different sub-carriers for each of the cells, and
for a different part of the period of the sub-frame for the MBMS, a common reference signal is time and frequency mapped to multiple of the cells.

8. A method used in a base station used in a mobile communications system which uses orthogonal frequency division multiplexing (OFDM) for downlink, comprising the steps of:
providing a control signal and a reference signal;
multiplexing the control signal and the reference signal, and generating a transmit symbol; and
inverse Fourier transforming the transmit symbol and wirelessly transmitting the transformed transmit symbol,
wherein a first sequence including a random code sequence and a second sequence belonging to an orthogonal-code sequence group are multiplied with the reference signal, mutually different ones of the orthogonal code sequences are used in respective multiple sectors belonging to a same cell, and different ones of the random code sequences are used in respective two or more of the cells,
wherein a reference signal transmitted in one sector among the multiple sectors and a reference signal transmitted in another sector among the multiple sectors are time and frequency mapped to different sub-carriers using the OFDM,
wherein the reference signal transmitted in the one sector and the reference signal transmitted in the another sector are distinguished using frequency division multiplexing,
wherein a sub-frame for multicast broadcast multimedia service (MBMS) and a sub-frame for unicast are time-multiplexed,
wherein, for a sub-frame for unicast, the reference signal transmitted in one sector and the reference signal transmitted in another sector are time and frequency mapped to a different sub-carrier for each of the cells, and
wherein, for a sub-frame for MBMS, the reference signal transmitted in one sector and the reference signal transmitted in another sector are time and frequency mapped to a common sub-carrier for multiple of the cells.

9. A user apparatus used in a mobile communications system which uses orthogonal frequency division multiplexing (OFDM) for downlink, comprising:
a unit which Fourier transforms a signal received from a base station, and derives a receive symbol;
a unit which demultiplexer, from the receive symbol, a data signal and a reference signal that include user data or control data a unit which multiplies, with the reference signal, a first sequence including a random code sequence and a second sequence belonging to an orthogonal code sequence group; and
a unit which performs channel estimation using the reference signal and demodulates the data signal,
wherein mutually different ones of the orthogonal code sequences are used in respective multiple sectors belonging to a same cell, and different ones of the random code sequences are used for respective two or more of the cells,
wherein a reference signal transmitted in one sector among the multiple sectors and a reference signal transmitted in another sector among the multiple sectors are time and frequency mapped to different sub-carriers using the OFDM,
wherein the reference signal transmitted in the one sector and the reference signal transmitted in the another sector are distinguished using frequency division wherein a sub-frame for multicast broadcast multimedia service (MBMS) and a sub-frame for unicast are time-multiplexed,
wherein, for a sub-frame for unicast, the reference signal transmitted in one sector and the reference signal transmitted in another sector are time and frequency mapped to a different sub-carrier for each of the cells, and
wherein, for a sub-frame for MBMS, the reference signal transmitted in one sector and the reference signal transmitted in another sector are time and frequency mapped to a common sub-carrier for multiple of the cells.

10. A method used in a mobile communications system which uses orthogonal frequency division multiplexing (OFDM) for downlink, comprising the steps of:
Fourier transforming a signal received from a base station, and deriving a receive symbol;
demultiplexing, from the receive symbol, a data signal and a reference signal that include user data or control data;
multiplying, with the reference signal, a first sequence including a random code sequence and a second sequence belonging to an orthogonal code sequence group;
performing channel estimation using the reference signal and demodulating the data signal,
wherein mutually different ones of the orthogonal code sequences are used in respective multiple sectors belonging to a same cell, and different ones of the random code sequences are used in respective two or more of the cells,
wherein a reference signal transmitted in one sector among the multiple sectors and a reference signal transmitted in another sector among the multiple sectors are time and frequency mapped to different sub-carriers using the OFDM,
wherein the reference signal transmitted in the one sector and the reference signal transmitted in the another sector are distinguished using frequency division multiplexing
wherein a sub-frame for multicast broadcast multimedia service (MBMS) and a sub-frame for unicast are time-multiplexed,
wherein, for a sub-frame for unicast, the reference signal transmitted in one sector and the reference signal transmitted in another sector are time and frequency mapped to a different sub-carrier for each of the cells, and
wherein, for a sub-frame for MBMS, the reference signal transmitted in one sector and the reference signal transmitted in another sector are time and frequency mapped to a common sub-carrier for multiple of the cells.

* * * * *